United States Patent [19]

Stich et al.

[11] Patent Number: 4,593,715

[45] Date of Patent: Jun. 10, 1986

[54] HYDRAULIC CONTROLLABLE TWO-PORT VALVE FOR A LIQUID STREAM

[75] Inventors: Bodo Stich, Wiesbaden; Ernst Hassler, Bad Camberg/Würges; Slawomir Adamowicz, Taunusstein, all of Fed. Rep. of Germany; Ivan J. Cyphelly, Gran Canaria, Spain

[73] Assignee: GLYCO-Antriebstechnik GmbH, Wiesbaden, Fed. Rep. of Germany

[21] Appl. No.: 677,123

[22] Filed: Dec. 3, 1984

[30] Foreign Application Priority Data

Dec. 2, 1983 [DE] Fed. Rep. of Germany ....... 3343620

[51] Int. Cl.⁴ ............................................. F16K 17/28
[52] U.S. Cl. .................................... 137/503; 137/110; 137/489; 137/625.49; 251/35
[58] Field of Search ........... 137/503, 110, 489, 625.49; 251/35

[56] References Cited

U.S. PATENT DOCUMENTS

| | | | |
|---|---|---|---|
| 2,635,636 | 4/1953 | Carson, Jr. ............................ | 251/35 |
| 3,254,667 | 6/1966 | McGuire et al. .................... | 137/504 |
| 3,315,694 | 4/1967 | Addison, Jr. ...................... | 251/35 X |
| 3,807,438 | 4/1974 | Posipsek ............................... | 137/489 |
| 3,842,855 | 10/1974 | Cyphelly ........................... | 137/82 X |

FOREIGN PATENT DOCUMENTS 1374160  11/1974  United Kingdom .

Primary Examiner—Martin P. Schwadron
Assistant Examiner—Stephen M. Hepperle
Attorney, Agent, or Firm—Karl F. Ross; Herbert Dubno

[57] ABSTRACT

A controllable two-way valve for pressure and/or flow control uses a cup-shaped piston, the bottom of which forms a large effective surface area exposed to a control flow through a slit which cooperates with an edge of the slider also serving to define the main flow cross section between an inlet and an outlet. A stationary compensating piston within this slider vents the interior of the slider and a control valve set connected to a spring chamber through which the control flow passes regulates the pressure applied to the slider in the spring compartment.

10 Claims, 5 Drawing Figures

4,593,715

HYDRAULIC CONTROLLABLE TWO-PORT VALVE FOR A LIQUID STREAM

FIELD OF THE INVENTION

Our present invention relates to a controllable pressure and flow-regulating valve for a fluid, especially a liquid stream, and, more particularly, to a two-port valve for pressure and flow control of a fluid stream having an inlet for the liquid, an outlet for the liquid and a differential piston forming a throttle valve slider which controls the main flow between the inlet and the outlet and defines a throttle opening for this main flow and also a control throttle passage for a control fluid which is used to regulate the position of the spring-biased valve slider.

BACKGROUND OF THE INVENTION

Two-port or two-way valves of the aforedescribed type, i.e. having a valve housing receiving the spring-biased differential piston and formed with the main fluid inlet, the main fluid outlet and a connection to a hydraulic control unit have been provided heretofore as built-in cartridge valves in hydraulic fluid technology, i.e. for hydraulic systems of various types. Such systems generally include a main pump or source of the hydraulic fluid, a hydraulic load such as a hydraulic motor or jack, and a hydraulic drain or reservoir into which the circuit empties and from which the hydraulic fluid is drawn by the pump.

The two-port valves with which the invention is concerned may be built into any of the control units of such a circuit or may be provided as a replaceable cartridge in such a unit and generally has a hydraulic network or valve set connected with the control port and at which a pressure is developed or established to shift the valve member or slider and thereby control the main fluid flow from the main inlet port to the main outlet port.

Such valves are utilized in hydraulic circuit technology for the digital (on/off) or analog (continuous-parameter) regulation of liquid streams.

In conventional two-port valves of this type, the differential-pressure-control element generally is a solid cylinder whose action can be stabilized only by fixed damping throttles for analog control. It is practically impossible for a single such element to provide satisfactory pressure control or flow rate control at least in part because in conventional valves of this type the main flow throttling affects the flow of liquid in the control circuit and hinders or precludes valve closure or switchover from an open to a closed state.

In German patent No. 1,927,883 a hydrostatic amplifying system is provided which utilizes a differential piston and which does not have this latter disadvantage although it does have another disadvantage in common with all of the above-described earlier systems, namely, the lack of a well-defined relationship between the position of the throttle slider or member and the controlled flow or pressure.

Another disadvantage of earlier systems is that close tolerance manufacture of the components is necessary.

OBJECTS OF THE INVENTION

It is the principal object of the present invention to provide a two-way valve of the aforedescribed type which is capable of high performance in both flow and pressure control and digital or analog applications, free from damping problems and problems arising from the positioning of the throttle in the main flow and displacement-dependent characteristics which have characterized earlier valves.

Another object of this invention is to provide a low cost pressure and flow-control valve for the purposes described whereby the disadvantages of earlier two-way valves are obviated.

Another object of this invention is to provide an improved valve system which can be fabricated with less concern for manufacturing tolerances, especially with regard to the throttle location.

SUMMARY OF THE INVENTION

These objects and others which will become apparent hereinafter are attained in a two-way valve for pressure and flow control of a liquid with a predetermined reproducible response having a valve body provided with an inlet and an outlet for the main flow of liquid, a spring-biased differential piston slider for controlling the main flow between the inlet and the outlet and whose movement defines the cross section of a main flow throttle, and a control throttle for a control flow acting upon the differential piston to vary the main flow throttle cross section.

According to the invention, a flow chamber is connected to the inlet port and communicates with a throttle slit forming the control throttle with a variable-cross section control opening to generate the control flow which communicates with a compartment containing the restoring spring acting upon the differential piston and provided with a control port connected to a control valve assembly so that the control opening of the throttle slit depends upon the position of the throttle slider.

By corresponding selection of the shape of the control opening in dependence of the position of the slider, we are able to ensure that the desired relationship between the control flow and the main flow is maintained in all positions and further that this relationship can be freely selectable over a wide range running from strict proportionality when the device is used as a flow-amplification element to a step characteristic when the device is used as the throttle or switching valve in a threshold response circuit.

According to a feature of the invention, the same edge of the throttle slider simultaneously forms the control opening for the throttle slit and the main flow throttle opening control edge, i.e. the main flow throttle opening and the throttle slit are both covered by the same edge of the differential piston slider.

The valve body is provided with a bore having a sleeve threaded into this bore and defining a cylindrical passage in which the slider is shiftable. The throttle slit can then be formed in an inner wall of the latter sleeve.

The spring compartment can likewise be formed in the sleeve and can be connected via a bore or series of bores with the throttle slit for the control flow.

According to another feature of the invention, the throttle slider can also have the form of a sleeve whose bottom is turned toward the spring compartment and whose open side is turned toward the inlet port and defines the control edge which cooperates with the throttle slit and defines the main flow passage.

Within this cup, a fixed compensating piston is disposed to establish the requisite relationship between the effective surface areas of the opposite ends of the differential-piston slider.

The interior of the slider communicates via a bore in this fixed compensating piston with the outlet port to maintain the inner surface of the slider at low pressure.

The shape and size of the throttle slit is so selected with respect to the main flow opening cross section that the main flow is always at least a multiple of the control flow. With a corresponding configuration of the opening characteristic of the throttle slit the control flow can be discontinuous in certain positions of the slider.

Naturally a plurality of control openings can also be provided with various throttle slits which can be brought selectively into play or simultaneously made effective in dependence upon the position of the throttle slider.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
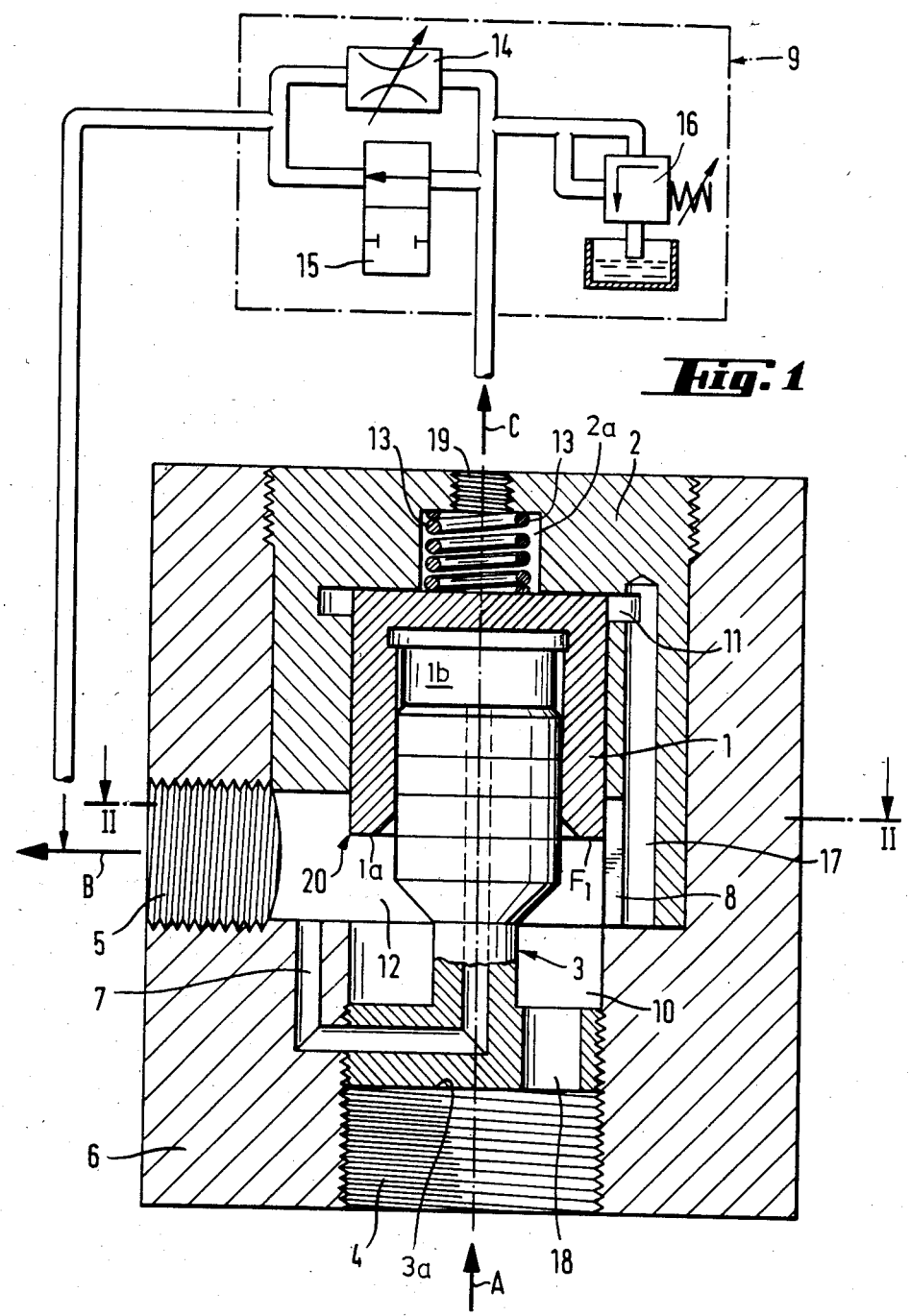
FIG. 1 is an axial section through a control valve for hydraulic applications in accordance with the invention, this section corresponding to a section taken along the line I—I of FIG. 2, and showing a control valve set for this unit in diagrammatic form.
Figure 2:
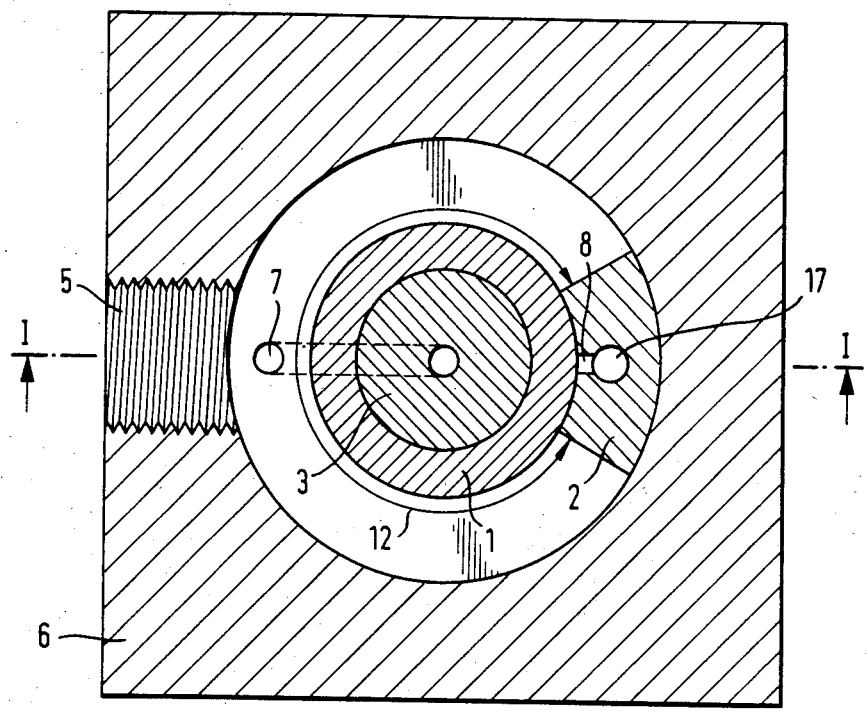
FIG. 2 is a cross sectional view taken along the line II—II of FIG. 1.
Figure 3:
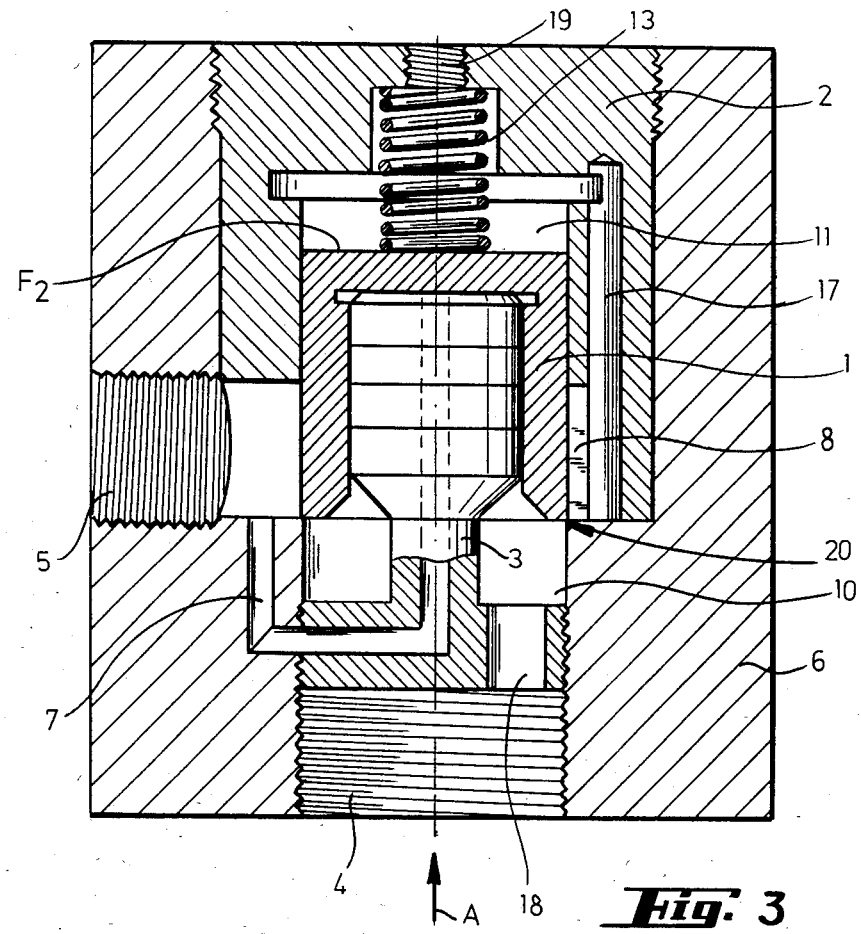
FIG. 3 is a section similar to FIG. 1 but showing the differential piston in its opposite limiting position.

As can be seen from FIGS. 1-3, the valve body 6 of the two-way valve comprises an inlet 4 and an outlet 5 disposed at right angles to one another for the main flow of fluid which is supplied in the direction represented by the arrow A and is discharged in the direction of the arrow B, representing respectively the inflow and the outflow from the valve. The inlet 4 and the outlet 5 are both internally threaded to facilitate connection of appropriate fittings thereto.

A female thread in the body 6 is engaged by the male thread of a sleeve 2 which is thus fixed in the body 6 and is formed with an axial bore in which a cup-shaped (or sleeve-shaped) throttle slider 1, formed as a differential piston, is axially shiftable.

The large effective surface area of the slider 1 is formed by the bottom thereof and is exposed to fluid pressure in this axial bore which defines a compartment 2a in which a restoring spring 13 is seated and which opens into the spring compartment 11 of the bore in which member 1 is slidable.

The small effective surface area of this differential piston slider is formed by the end surface 1a (Area $F_1$) of the slider delimited by an outer edge 20 which will be referred to subsequently.

To render the inner surface of the bottom of the slider 1 ineffective as a working piston surface, a fixed compensating piston 3 projects into the slider 1 and has its pedestal threaded into the bore 4.

This compensating piston is provided with a passage 7 which communicates with the interior 1b of the slider 1 and the port 5, i.e. the outlet so that the interior of the slider 1 is always at the low or outlet pressure of the regulating valve shown in FIGS. 1-3.

Via bores 18 in the pedestal 3a of the fixed piston 3, only the one such bore being visible in FIG. 1, communication is established between the inlet 4 and a flow chamber 10 in which the small effective surface of the slider 1 can be exposed directly to the high inlet pressure, i.e. the maximum inlet pressure.

The instantaneous axial position of the slider establishes the flow cross section of a main flow throttle opening 12 between the flow chamber 10 and the outlet 5.

The large effective surface $F_2$ is exposed to the pressure in the spring chamber 11, this chamber being in communication with a further threaded bore 19 via the compartment 2a. The threaded bore 19 serves to connect this regulating valve to a control valve set represented generally at 9 and through which the control flow C of the liquid is established, the control flow being returned to the outlet flow B as illustrated in FIG. 1. The control valve set 9 is of conventional design and can comprise, for example, a flow controller which can be provided with a manual throttle, a two-position valve 15, in one position of which the throttle 14 is bypassed while in the other position the throttle 14 is fully effective, and a pressure relief valve 16 limiting the pressure in the control valve set.

A key to the present invention which provides progressive control of the two-way valve is a self-compensating half bridge for the control of the position of the throttle slider 1. This self-compensating half bridge results on the one hand from the construction of the throttle slider 1 as a differential piston and, on the other hand from the provision of a follower resistance, i.e. a resistance of the control flow whose value is directly a function of the position of the throttle slider 1. This follower resistance is determined by the relationship of the control edge 20 of the throttle slider 1 and a throttle slit formed directly in the sleeve 2 and connected with the compartment 11 via a bore 17. Consequently, the same control edge 20 defines the main flow cross section and the control flow cross section of the throttle slit 8.

The throttle slit 8 thus regulates the control flow C, the liquid between the flow chamber 10 and the spring chamber 11. The movement of the slider 1 must be sufficient to provide the necessary variation in the control opening of the slit 8 to afford the desired degree of continuity between a control input established by the valve set 9 and the opening desired for the main flow. In other words, while a self-regulation of the position of the slider is established between the control flow and the main flow so that any increase in the inlet pressure will result in a corresponding reduction of the main flow cross section as a result of the increase in the control stream pressure applied to the large surface $F_2$ of the slider 1, the actual position of this slider is determined by the rate at which the control flow is bled by the valve set 9 from the port 19.

Consequently, as soon as the position of the slider corresponds to a particular throttle value of the control value set 9, the valve formed by the slider 1 becomes self-regulating in the manner just described. The opening characteristics of the throttle slit 8 and the main flow cross section can be essentially the same. In this case, the main flow B will be directly proportional to the control flow C. In this case the progressively controllable two-way valve acts as a flow amplifier whose amplification factor is determined by the ratio of the flow cross section to the opening 12 to the flow cross section of the opening formed by the follower throttle slit 8, assuming as is generally the case, the force contribution to the restoring spring 13 is negligible at least with respect to the force contribution of the inlet pressure.

The device is thus highly effective for proportional control both of pressure and of flow because in the main flow between inlet 4 and outlet 5, no measuring orifice is provided as is necessary in conventional valves and all of the control is effected at the valve set 9. The pressure established by the valve set 9 can always faithfully be transmitted with the aforementioned flow amplification factor to the main flow side of the system.

Of course, it is possible to provide the follower throttle slit 8 so that its opening characteristics are different from those of the main flow opening 12. The relationship can range from any selected monotonically increasing function to a discontinuous or quasi-discontinuous function relating the main flow to the control flow. For example, in FIG. 5, the slit 8a is shown to have a construction at 8b which can provide a discontinuity in the characteristic plot of the control flow rate versus displacement of the slider edge 20.

It is also possible to provide a plurality of follower throttle slits, all of which communicate via respective bores 17 with the spring compartment 11 and to allow these slits to be brought into play simultaneously or in an externally selectable manner by position control of the slider 1.

Figures 4, 5:
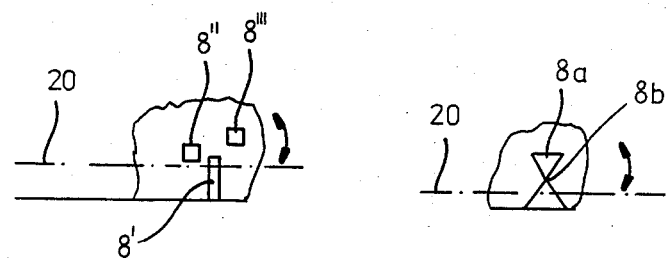
FIG. 4 is a diagram representing a developed view of a portion of the wall provided with a throttle slit in another embodiment of the invention in which a plurality of throttle slit openings are selectively brought into play by the differential piston slider.
FIG. 5 is a view similar to FIG. 4 showing a throttle slit of another configuration.

In FIG. 4, three such slits 8', 8" and 8"' are shown and are brought into play by selectively positioning the edge 20 of the slider.

In this manner the characteristic of the two-way valve of the invention can be controlled from the exterior. A limiting case can be provided by an external blocking of the connection between flow chamber 10 and the spring chamber 11, e.g. by a valve which is externally controlled and provided in the bore 17. In this case, a pressureless path is provided between the inlet and the outlet since the throttle slider 1, when the valve closes the bore 17, is brought into its uppermost position (FIG. 1). In this case control valve set 9 would have no effect. With the bore 17 open, however, and the application of fluid pressure to the port 4, opening of the outflow at port 19 will always automatically position the slider 1 to a position corresponding to the control flow. A change in the relationship between the control flow C and the main flow B can be effected simply by modifying the sleeve 2 to alter the form of the throttle slit 8 and the relationship between the latter and the edge 20 of the throttle slider but which cooperates therewith.

We claim:

1. A pressure and flow control valve for a liquid medium which comprises:
    a valve body formed with an inlet and with an outlet for a main flow of said medium;
    a differential piston slider received in said body and shiftable to define a main flow opening cross section between said inlet and said outlet, said slider being positioned and constructed to have small effective surface exposed to the inlet pressure of said main flow;
    means forming a throttle slit communicating with a spring compartment formed in said body and in which a large effective surface of said slider is exposed to a control flow of said medium passing through said throttle slit to said spring compartment;
    a spring in said spring compartment bearing upon said slider, said throttle slit defining with said slider a variable control opening cross section dependent upon the position of said slider in said body;
    means forming a flow chamber connected with said inlet and communicating with said throttle slit through said control opening cross section; and
    a control valve set communicating through a control port formed in said body with said spring compartment for establishing a pressure in said spring compartment to control the position of said slider in said body, said slider being formed with a control edge defining both said control opening cross section and said main flow cross section, said slider being received in an axial bore formed in said body and said slit being formed in a wall of said bore.

2. The pressure and flow control valve defined in claim 1 wherein said bore is formed in a sleeve threaded into said body and provided with said slit.

3. The pressure and flow control valve defined in claim 2 wherein said compartment is formed in said sleeve and communicates with said slit by a bore provided in said sleeve.

4. The pressure and flow control valve defined in claim 2 wherein said slider has a cup configuration having an open side turned toward said inlet and a bottom forming said large effective surface in said compartment, said valve being provided with a stationary compensating piston extending into said slider and establishing a predetermined relationship between the effective areas of said surface.

5. The pressure and flow control valve defined in claim 3 wherein said slider has a cup configuration having an open side turned toward said inlet and a bottom forming said large effective surface in said compartment, said valve being provided with a stationary compensating piston extending into said slider and establishing a predetermined relationship between the effective areas of said surface.

6. The pressure and flow control valve defined in claim 4 wherein said compensating piston is formed with a passage communicating between the interior of said slider and said outlet for depressurizing the interior of said slider.

7. The pressure and flow control valve defined in claim 5 wherein said compensating piston is formed with a passage communicating between the interior of said slider and said outlet for depressurizing the interior of said slider.

8. The pressure and flow control valve defined in claim 1 wherein said slit has a configuration such that the characteristic of the control cross section with displacement of said slider corresponds to the characteristic of the flow cross section of said main flow cross section and the main flow from said inlet to said outlet is a multiple of a control flow through said slit.

9. The pressure and flow control valve defined in claim 1 wherein the configuration of said slit is such that the opening characteristic of said control cross section with displacement of said slider is discontinuous.

10. The pressure and flow control valve defined in claim 1 wherein a plurality of such throttle slits are provided and said throttle slits are selectively brought into communication with said linet by a response to an external command in accordance with the position of said slider.

* * * * *